United States Patent [19]

Sobey

[11] 4,232,844
[45] Nov. 11, 1980

[54] AEROFOIL WITH COMPOSITE TIP SECTION HAVING SKEWED FIBRES

[75] Inventor: Arnold J. Sobey, Hindhead, England

[73] Assignee: The Secretary of State for Defence in Her Britannic Majesty's Government of the United Kingdom of Great Britain and Northern Ireland, London, England

[21] Appl. No.: 445

[22] Filed: Jan. 2, 1979

[30] Foreign Application Priority Data

Jan. 3, 1978 [GB] United Kingdom ............... 00097/78

[51] Int. Cl.³ ................................................ B64C 3/20
[52] U.S. Cl. ................................ 244/123; 416/230 R; 416/230 A
[58] Field of Search ........... 244/123; 416/230, 230 A, 416/226, 228 A

[56] References Cited

U.S. PATENT DOCUMENTS

| 3,645,829 | 2/1972 | Palfreyman et al. | 244/123 X |
|---|---|---|---|
| 3,713,753 | 1/1973 | Brunsch | 244/123 X |
| 3,782,856 | 1/1974 | Salkind et al. | 416/230 A X |
| 4,022,547 | 5/1977 | Stanley | 416/230 |
| 4,130,377 | 12/1978 | Blackwell | 416/228A |

Primary Examiner—Barry L. Kelmachter
Attorney, Agent, or Firm—Cushman, Darby & Cushman

[57] ABSTRACT

An aerofoil has a tip section formed at least in part of composite structure wherein a substantial number of fibres are skew to the spanwise direction, resulting in the direction of principal bending stiffness of the aerofoil being diverted away from the spanwise direction in said tip section to induce twist under certain loading conditions.

3 Claims, 3 Drawing Figures

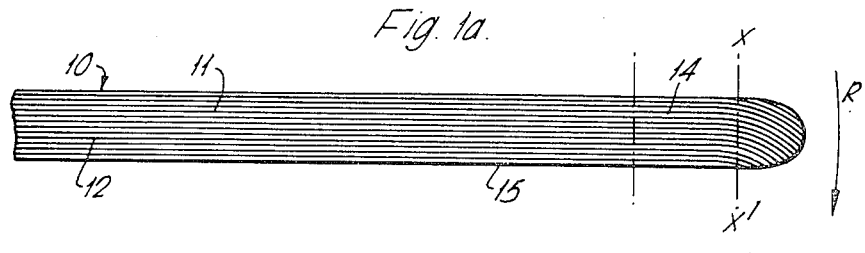
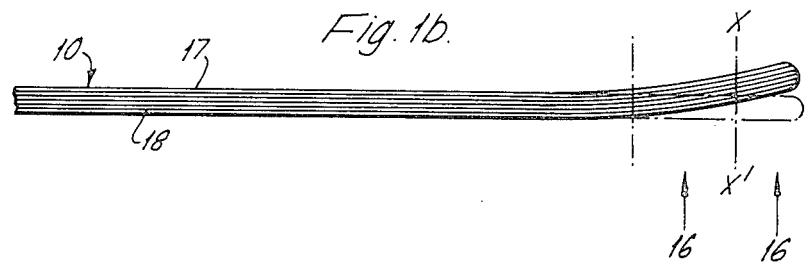
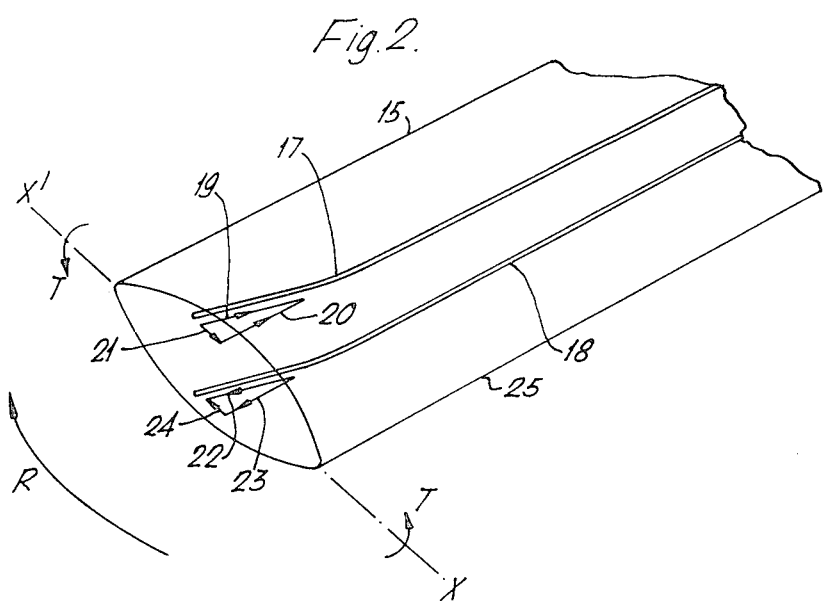

AEROFOIL WITH COMPOSITE TIP SECTION HAVING SKEWED FIBRES

DESCRIPTION

This Invention relates to aerofoils.

In aircraft design rigorous attention is paid to aerofoil performance under stress conditions. Such conditions are particularly complex in rotary wing aircraft. The rotor blades of a helicopter, for example, are continuously subjected to cyclic load variation as the blades traverse the disc of rotation. This variation causes vibration which may be transmitted to the body of the aircraft. Also fatigue may be a hazard particularly if the blades or mountings are partly of metal construction.

The high speed of rotation of modern helicopter rotors results in transonic flow conditions at the tip section of a rotor blade when the blade is advancing. Hence incidence of the tip section can induce very high drag. In retreat the speed of the air-flow at the tip section is much reduced and the tip of the rotor blade may stall causing unwanted vibration and noise. A further problem is that intense vortices are shed from the tip during rotation, making a significant contribution to the overall noise level.

In an attempt to alleviate some of these problems designs have been proposed in which the tip section of an aerofoil is swept away from the spanwise direction. However, for helicopter rotor blades the conflicting requirements encountered when the blade is advancing and retreating make it difficult to achieve substantial preformance gains.

In order to improve the performance of aircraft it is desirable that aerofoils be as light as possible. To this end, research into new materials for the construction of aerofoils continues. Composite structure which consists of a plurality of fibres embedded in a matrix material has emerged as suitable for rotor blade construction. Such blades are generally fabricated by laying pre-impregnated sheets one on another. Careful orientation of the sheets establishes orthotropic properties, while maintaining the direction of principal bending stiffness substantially spanwise.

According to the present invention an aerofoil having a direction of principal bending stiffness extending substantially spanwise includes a tip section formed at least in part of composite structure wherein a substantial number of fibers are skew to the spanwise direction such that the direction of principal bending stiffness is diverted away from the spanwise direction towards an edge of the aerofoil.

The direction of principal bending stiffness may be diverted towards the leading or trailing edge of the aerofoil.

In a preferred embodiment of the present invention a substantial number of fibers extending substantially spanwise are diverted away from the spanwise direction towards an edge of the aerofoil. Each fibre is preferably diverted to the same degree.

The tip section of the aerofoil may be swept, and the direction of principal bending stiffness may be advantageously diverted in a direction to enhance the effects of the swept tip section.

In order that features of the present invention may be better appreciated an embodiment of the invention will now be described, by way of example only, with reference to the accompanying diagrammatic drawings of which:

FIG. 1(a) shows a plan view of a helicopter rotor blade formed of composite material, FIG. 1(b) shows an elevation of an helicopter rotor blade subjected to an upward loading, FIG. 2 shows a perspective view of a rotor blade tip section.

In a helicopter rotor blade 10 (FIG. 1(a) and (b)) formed of composite material having fibres, such as fibres 11 and 12 embedded in a matrix material, the fibres run the length of the blade in a spanwise direction. In a tip section of the blade shown generally at 14, parts of the fibres close to the tip are diverted away from the spanwise direction towards a leading edge 15 in order to divert the direction of principal bending stiffness by between 15° and 25°.

If the blade is loaded, for example by an upward load as indicated by arrows 16 in FIG. 1(b), the blade bends. This bending, shown for clarity at the tip section only, causes stresses to be applied to the material of the blade. For example, fibres lying towards the top of the blade, such as fibre 17 are subjected to a compressive load. For fibres lying towards the bottom of the blade, such as the fibre 18, the load is tensile. The situation is shown more clearly in FIG. 2, which is a section of the blade 10 at $X-X^1$.

Fibre 17 is compressively loaded in a direction indicated by 19. This load may be resolved into a component 20 in the spanwise direction and a component 21 normal to the spanwise direction. The load on fibre 18 is tensile in a direction indicated by 22, and may similarly be resolved into components 23 and 24. Hence it may be seen that a couple, as formed by components 21 and 24, is required to prevent chordwise twisting of the tip section. In the absence of this couple, reaction of the tip section to a uniform bending load incudes twisting in the chordwise direction T as indicated.

In use, when the blade 10 is rotating in the direction indicated by R, if the tip section 14 carries an upward load twist occurs such that the tip incidence is reduced. If the tip section 14 carries a downward load tip incidence is reduced by twist in the opposite direction. Thus a blade having a tip section with substantially zero incidence around the disc of rotation may be constructed advantageously reducing drag, particularly in transonic flow conditions.

In an aerofoil in accordance with the present invention, twist tending to relieve the tip loading occurs as the aerofoil is subjected to a bending load, reducing vibration and the likelihood of fatigue. Another advantage is that twisting of the aerofoil tip tends to diffuse the vortices shed from the tip, thereby reducing noise.

It will be appreciated that by careful choice of configuration and materials aerofoils exhibiting a variety of twisting characteristics may be constructed. For example, the effect may be confined to the last few percent of span of the aerofoil or extended in-board for some distance. Twist may occur in either direction, the degree of twist may have a linear relationship with applied load.

It will be realised that in an aerofoil in accordance with the present invention any type of fibres or mixture of fibres may be used, including carbon fibres and glass fibres.

It will further be realised that not all the aerofoil need be formed of composite material. For example, parts may be formed of metal, which may or may not contribute to the aerofoil stiffness, to reduce wear due to foreign bodies such as sand or dust.

What I claim is:

1. An aerofoil having a direction of principal bending stiffness extending substantially spanwise, said aerofoil comprising a tip section formed at least in part of composite structure in which a plurality of fibres extend generally parallel to a spanwise axis of said areofoil and wherein a substantial number of said fibres terminate at said tip section in positions skewed to the spanwise direction such that the direction of principal bending stiffness is diverted away from the spanwise direction in said tip section towards an edge of the aerofoil.

2. An aerofoil as claimed in claim 1 wherein said composite structure comprises carbon fibres.

3. An aerofoil as claimed in claim 1, wherein said composite structure comprises glass fibres.

* * * * *